(12) United States Patent
Furukawa

(10) Patent No.: US 8,173,283 B2
(45) Date of Patent: May 8, 2012

(54) CERAMIC SUBSTRATE

(75) Inventor: Shigenobu Furukawa, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/626,518

(22) Filed: Nov. 25, 2009

(65) Prior Publication Data
US 2010/0136279 A1 Jun. 3, 2010

(30) Foreign Application Priority Data
Nov. 27, 2008 (JP) ................. 2008-302010

(51) Int. Cl.
B32B 3/00 (2006.01)
B32B 3/02 (2006.01)
G01R 17/22 (2006.01)
C03C 6/02 (2006.01)

(52) U.S. Cl. ............ 428/846.9; 428/64.1; 501/154; 73/12.12; 73/32 A; 73/576

(58) Field of Classification Search ............ 73/723, 73/579, 570, 727, 726, 728, 12.12, 32 A, 73/576, 27; 428/688, 421, 64.2, 848, 848.1, 428/848.2, 64.1, 846.9, 704; 430/270.12; 252/520.2, 520.1, 521.3; 360/99.12, 135; 264/642, 85; 501/152, 153, 150, 154; 210/490
See application file for complete search history.

(56) References Cited

U.S. PATENT DOCUMENTS 3,951,873 A * 4/1976 Kikuchi et al. ............ 252/520.2
4,932,265 A * 6/1990 Skuratovsky et al. ........ 73/727
2002/0048691 A1* 4/2002 Davis et al. ................ 428/848.2
2003/0078156 A1* 4/2003 Lowden et al. ............... 501/127
2003/0099062 A1* 5/2003 Kataoka et al. ............ 360/99.12
2005/0016276 A1* 1/2005 Guan et al. ..................... 73/579
2005/0139542 A1* 6/2005 Dickensheets et al. ....... 210/490
2005/0202201 A1* 9/2005 Hay et al. ..................... 428/64.2
2005/0233151 A1* 10/2005 Feist et al. .................... 428/421
2006/0057421 A1* 3/2006 Maria et al. .................. 428/688
2007/0082294 A1* 4/2007 Goto et al. ............... 430/270.12
2007/0089515 A1* 4/2007 Shih et al. ...................... 73/579
2008/0011811 A1* 1/2008 Kwon et al. ................ 228/110.1
2008/0141780 A1* 6/2008 Wavering et al. .............. 73/723

FOREIGN PATENT DOCUMENTS
JP 08-017888 1/1996

OTHER PUBLICATIONS
Translation JP 08-017888 Jiyunichirou et al (Jan. 19, 1996).*

* cited by examiner

Primary Examiner — Kevin M. Bernatz
Assistant Examiner — Louis Falasco
(74) Attorney, Agent, or Firm — DLA Piper LLP (US)

(57) ABSTRACT

A ceramic substrate according to one aspect of the invention comprises a main surface wherein a diameter of a first imaginary circle inscribed in a circumference of the main surface is represented by C (m), a thickness of the ceramic substrate is represented by h (m), a Poisson ratio of the ceramic substrate is represented by ν, a density of the ceramic substrate is represented by ρ(kg/m³), a Young's modulus of the ceramic substrate is represented by E(Pa), a deflection of the ceramic substrate is represented by X (m), the deflection being measured in a condition that the ceramic substrate is supported in a region between the first imaginary circle and a second imaginary circle which is a concentric circle of the first imaginary circle and has a diameter of C-0.01 (m), wherein $X \leq 1.5 \times (C^4/h^2) \times A$ and $A = \{3 \times 9.807 \times \rho \times (1-v^2) \times (5+v)\}/\{2^8 \times (1+v) \times E\}$ are satisfied.

2 Claims, 7 Drawing Sheets

_US 8,173,283 B2_

CERAMIC SUBSTRATE

CROSS REFERENCE TO RELATED APPLICATION(S)

The present application claims priority under 35 U.S.C. §119 to Japanese Patent Application No. 2008-302010, filed Nov. 27, 2008, entitled "SUBSTRATE FOR HOLDING SENSOR, SENSOR-HOLDING SUBSTRATE, AND METHOD FOR PRODUCING SUBSTRATE FOR HOLDING SENSOR," the entirety of which is incorporated by reference herein.

BACKGROUND OF THE INVENTION

1. Field of the Invention

The present invention relates to a ceramic substrate.

2. Description of the Related Art

For manufacturing semiconductor devices, a heating/cooling apparatus to heat or cool a semiconductor wafer (hereinafter referred to as a "wafer") is used. In the heating/cooling process, in order to set the wafer at a predetermined temperature distribution, temperature control conditions in the heating/cooling apparatus need to be specifically determined.

For determination of the temperature control conditions in the heating/cooling apparatus, a circuit substrate for holding sensors has been used. For example, a circuit substrate with sensors are is placed in a heating/cooling apparatus, and a plurality of sensors on the circuit substrate measure temperature fluctuation in the heating/cooling process. Based on the measurement result, the temperature conditions in the heating/cooling apparatus are adjusted so that a wafer can have desired temperature distribution during heating or cooling.

As an example of a substrate for holding sensors, a ceramic substrate is shown in Japanese Unexamined Patent Application Publication No. 8-17888 (Patent Document 1). The Patent Document 1 describes a substrate composed of a sintered polycrystalline aluminum oxide body having an average strength of 450 MPa or more, an average crystal grain size of 5 μm or less, a bulk density of 3,980 kg/m³ or more, and a purity of 99.9% by mass or more.

In recent years, the thickness of wafers has been reduced and the size of wafers has been increased. The thickness of circuit substrates has been reduced and the size of circuit substrates has been increased. As the thickness of circuit substrates becomes smaller and the size of circuit substrates becomes larger, the circuit substrate become likely to deflect or vibrate. For example, there may be cases where circuit substrates are deflected due to an acceleration applied to the sensor-holding substrates carried in and out of the heating/cooling apparatus, and then the circuit substrates vibrate. When temperature or the like is measured in a state where a circuit substrate vibrates, there may be a case where the temperature cannot be measured accurately because malfunctions of sensors, errors in sending or receiving signals to or from sensors, or the like occur. Therefore, it is desirable that the time from when a circuit substrate is deflected to when the vibration decays and disappears is as short as possible.

If conventional ceramic substrate as described in Patent Document 1 have smaller thickness and larger size, deflection or the like may relatively occur due to residual stress which is generated at the time of sintering. If the ceramic substrate described in patent Document 1 is used as a substrate for holding sensors like the circuit substrate, there is a possibility that the decay time of vibration due to deflection may be increased.

SUMMARY OF THE INVENTION

The present invention has been achieved in view of the problems described above. It is an object of the present invention to provide a ceramic substrate in which vibration decay time can be shortened.

According to an embodiment of the invention, a ceramic substrate comprises a main surface, wherein $X \leq 1.5 \times (C^4/h^2) \times A$ and $A = \{3 \times 9.807 \times \rho \times (1-v^2) \times (5+v)\}/\{2^8 \times (1-v) \times E\}$ are satisfied. The parameter of $C$ (m) represents a diameter of a first imaginary circle inscribed in a circumference of the main surface. The parameter of $h$ (m) represents a thickness of the ceramic substrate. The parameter of $v$ represents a Poisson ratio of the ceramic substrate. The parameter of $\rho$ (kg/m³) represents a density of the ceramic substrate. The parameter of $E$ (Pa) represents a Young's modulus of the ceramic substrate. The parameter of $X$ (m) represents a deflection of the ceramic substrate which is measured in a condition that the ceramic substrate is supported in a region between the first imaginary circle and a second imaginary circle which is a concentric circle of the first imaginary circle and has a diameter of $C-0.01$ (m).

In a ceramic substrate according to an embodiment of the present invention, the decay time of vibration due to deflection is short. If the ceramic substrate is used, for example, as a sensor-equipped substrate, malfunctions of sensors can be reduced because sensors are attached to a sensor-holding substrate in which vibration decay time is short.

DESCRIPTION OF THE EXEMPLARY EMBODIMENTS

Figure 1A:
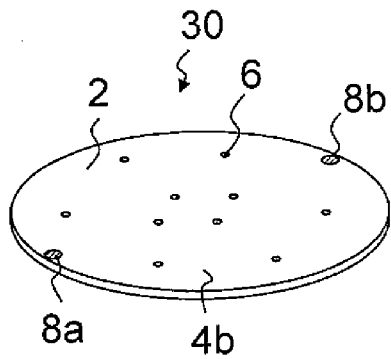
FIGS. 1A and 1B are each a perspective view of a circuit substrate according to an embodiment of the present invention.
Figure 1B:
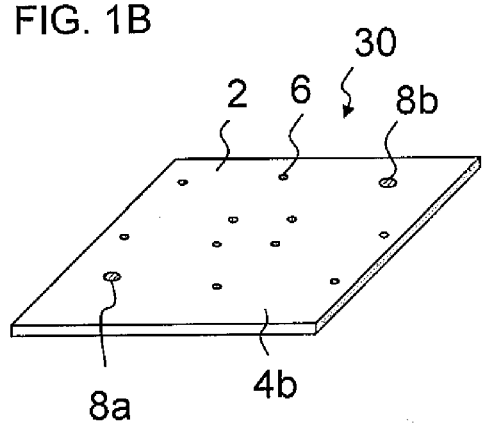
Figure 1C:
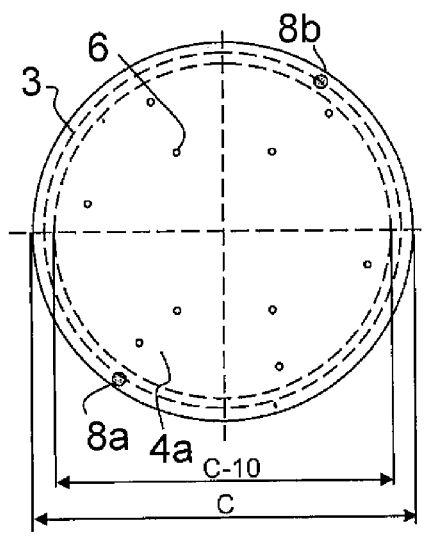
FIG. 1C is a plan view showing positions for supporting a main surface of the substrate shown in FIG. 1A.
Figure 1D:
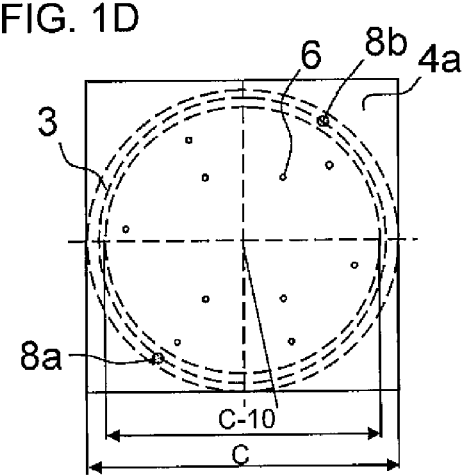
FIG. 1D is a plan view showing positions for supporting a main surface of the substrate shown in FIG. 1B.
Figure 1E:
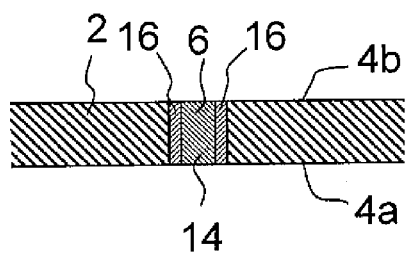
FIG. 1E is a partial enlarged cross-sectional view of the substrate shown in FIG. 1A.
Figure 1F:
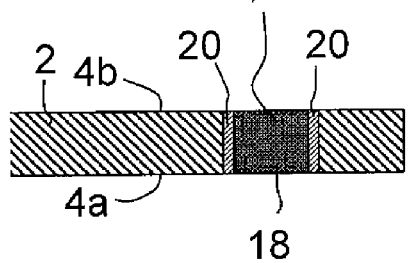
FIG. 1F is a partial enlarged cross-sectional view of the substrate shown in FIG. 1B.

In the following description of exemplary embodiments, reference is made to the accompanying drawings which form a part hereof, and in which it is shown by way of example specific embodiments in which the invention may be practiced. It is to be understood that other embodiments may be utilized and structural changes may be made without departing from the scope of the present invention.

A circuit substrate 30, which is one of exemplary embodiments of the present invention, is described with reference to FIGS. 1A to 2. A circuit substrate 30 includes a ceramic substrate 2 and having an area of 0.03 m² or more and a thickness of 0.0003 m or more. In the ceramic substrate 2, the diameter of a first imaginary circle inscribed in a main surface 4a is represented by C (m), and equation (1) below is satisfied. A deflection is represented by X (m), the deflection being measured in a condition that the ceramic substrate is supported, with the main surface 4a being directed downward, in a region between the first imaginary circle and a second imaginary circle which is a concentric circle of the first imaginary circle and has a diameter of C-0.01 (m).

$$X \leq 1.5(C^4/h^2) \times A \qquad (1)$$

provided that $$A = \{3 \times 9.807 \times \rho(1-\nu^2)(5+\nu)\}/\{2^8 \times (1+\nu) \times E\},$$

where $\nu$ is the Poisson's ratio (-) of the circuit substrate 30, $\rho$ is the density (kg/m³) of the circuit substrate 30, E is the Young's modulus (Pa) of the circuit substrate 30, and h is the thickness (m) of the circuit substrate 30.

The equation (1) can be derived from equation (2) below. The equation (2) represents the theoretical value of an own-weight deflection $\omega$ of a substrate having a circular main surface with a diameter C in a condition that the periphery of the main surface is supported.

$$\omega = \{(5+\nu)pa^4\}/\{64(1+\nu)D\}(m) \qquad (2)$$

provided that $$D = Eh^3/\{12(1-\nu^2)\},$$

where p is the uniformly distributed load (Pa) due to the own weight of the circuit substrate 30, and a is C/2 (m).

In the equation (2), p is the uniformly distributed load (Pa) due to the own weight of the circuit substrate 30, and can be expressed by the following equation:

$$p = (9.80665a^2\pi h\rho)/(a^2\pi) = 9.80665h\rho(\text{Pa})$$

The equation (1) shows that, with respect to the theoretical value of the own-weight deflection $\omega$ represented by the equation (2), the relationship $X \leq 1.5 \times \omega$ is satisfied.

If an exemplary embodiment of the invention is not a circuit substrate but a ceramic substrate which has no conductors, alignment marks or wiring lines, the parameters of the circuit substrate such as $\nu$, $\rho$, p, E, h, C, a, X and $\omega$ in the equation (1) and (2) are replaced by parameters of ceramic substrate. For example, $\nu$ is the Poisson's ratio (-) of the ceramic substrate, $\rho$ is the density (kg/m³) of the ceramic substrate, E is the Young's modulus (Pa) of the ceramic substrate, h is the thickness (m) of the ceramic substrate, and p is the uniformly distributed load (Pa) due to the own weight of the ceramic substrate.

The circuit substrate 30 having such a structure has an advantage in that the decay time of vibration due to deflection can be shortened.

The circuit substrate 30 according to the embodiment has a main surface with a relatively large area of 0.03 m² or more, and has relatively large mechanical strength with a thickness of 0.0003 m or more. Although the circuit substrate 30 according to the embodiment has a main surface with a relatively large area and has a relatively small thickness, its own-weight deflection is close to the theoretical value. Therefore, vibration decay time is short.

In the equation (1), the density is measured by Archimedes' method.

The Young's modulus and the Poisson's ratio are measured using an ultrasonic pulse method. A specific measurement method is described below.

That is, 5.3.2(1) of Japanese Industrial Standard JIS R 1602-1995 Testing methods for elastic modulus of fine ceramics defines the size of a specimen. In the case of the circuit substrate 30, the circuit substrate 30 itself is used as a test specimen for measurement. As a measurement apparatus, for example, an HV pulser-receiver Model 5058PR, commercially available from Panametrics, can be used. In the measurement, a longitudinal wave wavelength of 5,000 to 8,000 kHz and a transverse wave wavelength of 2,000 to 5,000 kHz are used. For data analysis, a 23422A 250MS/s Digital Oscilloscope, commercially available from Tektronix, or the like can be used. The measurement temperature is preferably room temperature (about 25° C.). Furthermore, when the Young's modulus and the Poisson's ratio are measured by the ultrasonic pulse method, preferably, measurement is performed at least five times per test specimen, and an average value thereof is calculated.

If the size of the circuit substrate 3D is too large to measure the Young's modulus and the Poisson's ratio, the circuit substrate 30 is machined into a square specimen with a side of 0.2 m and use it as a test specimen for measuring the Young's modulus and the Poisson's ratio by the ultrasonic pulse method.

Even when the conductors 6, alignment marks 8a and 8b, and wiring lines 10 are arranged on the circuit substrate 30, in many cases, the value $\omega$ is substantially the same as that in the case where they are not arranged. Furthermore, the unit of measure of the value $\omega$ is (m) according to the equation (2).

Figure 4A:
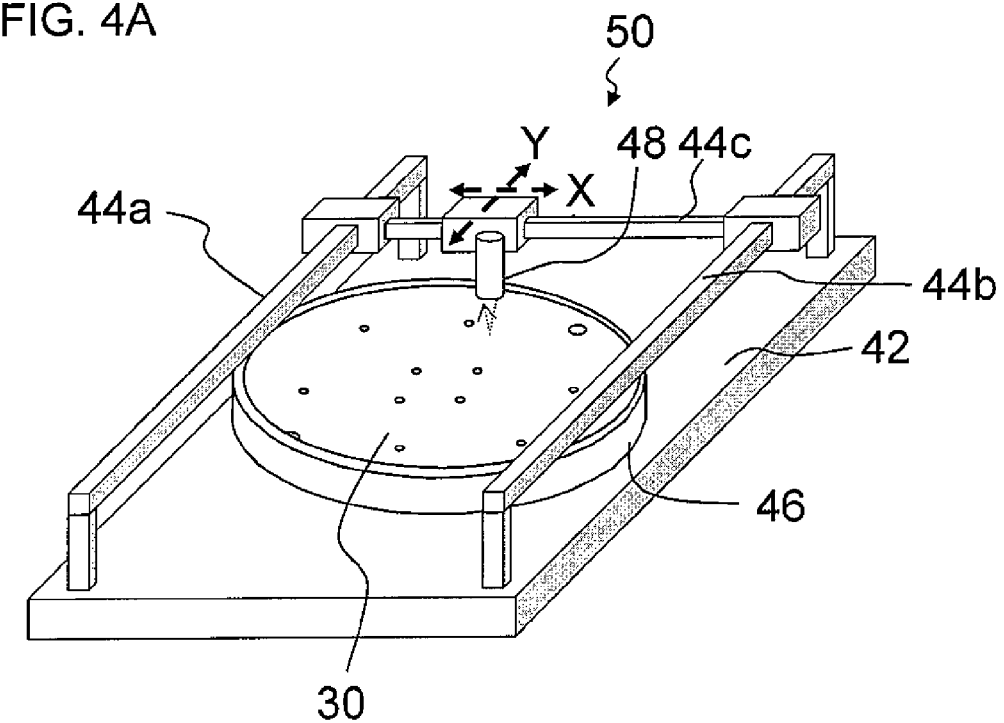
FIG. 4A is a perspective view of an apparatus for measuring own-weight deflection.
Figure 4B:
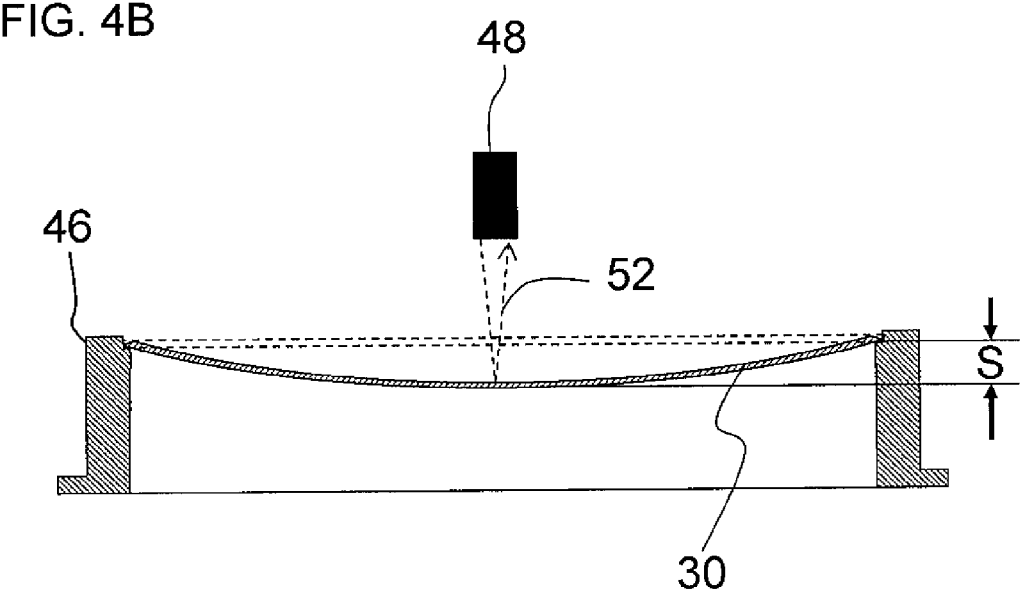
FIG. 4B is a partial cross-sectional view of the apparatus shown in FIG. 4A.

The own-weight deflection is measured by an apparatus 50 for measuring own-weight deflection shown in FIGS. 4A and 4B. FIG. 4A is a perspective view of the apparatus 50 for measuring own-weight deflection and FIG. 4B is a partial cross-sectional view of the apparatus shown in FIG. 4A. The apparatus 50 for measuring own-weight deflection includes a base 42, guide frames 44a, 44b, and 44c fixed on the base 42, and a movable member 48a. The guide frames 44a and 44b are parallel to each other and guide the movable member 48a in a Y direction orthogonal to an X direction. The X and Y directions are set perpendicular to gravity. The guide frame 44c guides the movable member 48a in the X direction. A laser emitter 48 is fixed to the movable member 48a and can move, together with the movable member 48a, in a plane defined by the X direction and the Y direction. A circuit substrate 30 is fixed to the base 42 by a plurality of fixing jigs 46.

A laser beam 52 emitted from the laser emitter 48 is applied to and reflected from the circuit substrate 30. Reflected light of the laser beam 52 passes through the movable member 48a and is transmitted to an analyzer (not shown). In such a manner, the distance between the laser emitter 48 and the circuit substrate 30 is measured at a plurality of points over the entire main surface 4b. As a result, the deflection (deflection distance) S of the circuit substrate 30 can be determined. In the circuit substrate 30 satisfying the equation (1), the decay time of vibration due to deflection is short, which is supposedly due to small internal stress of the ceramic substrate 2 constituting the main body.

Figure 5A:
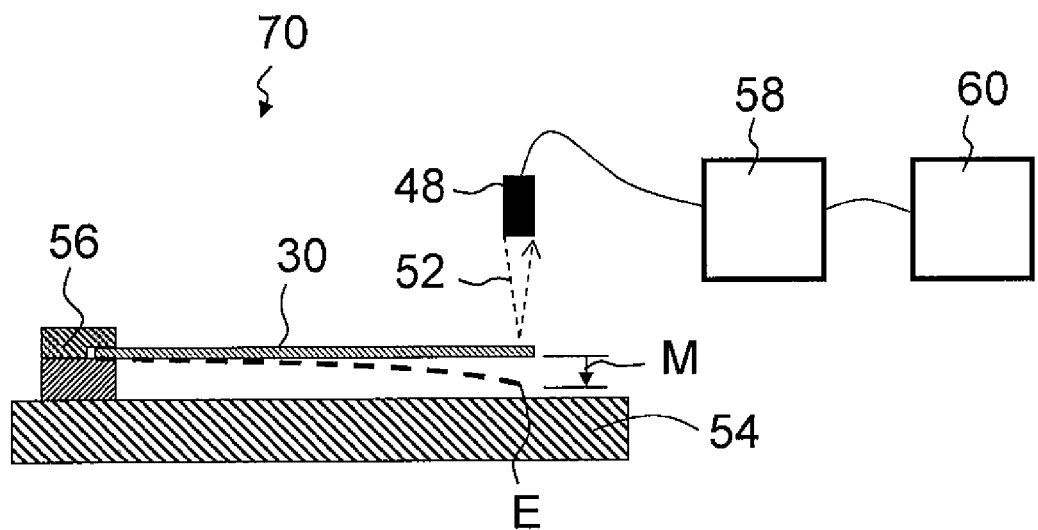
FIG. 5A is a cross-sectional view of a vibration measurement apparatus.
Figure 5B:
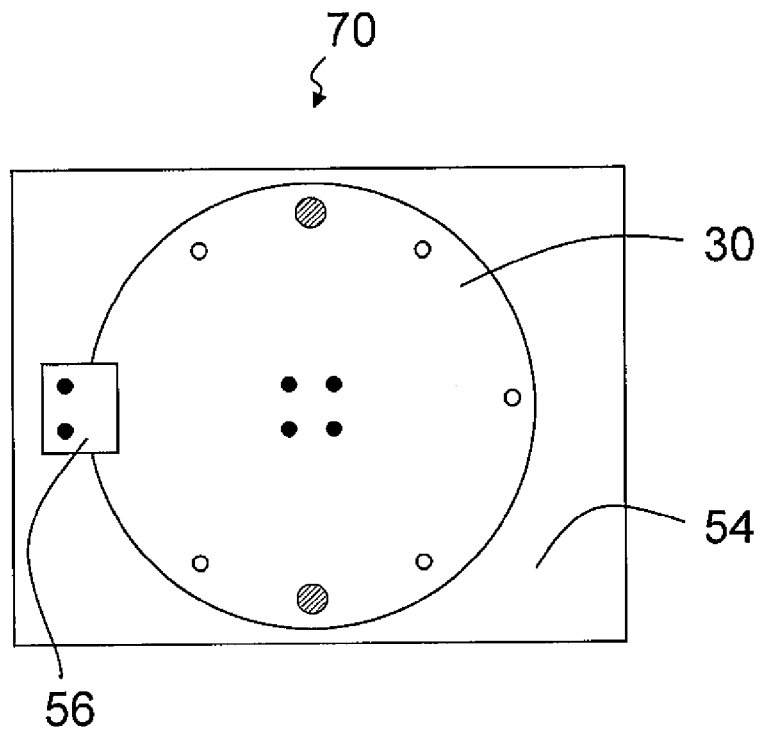
FIG. 5B is a top view of the vibration measurement apparatus.

The decay time of vibration due to deflection can be measured using a vibration measurement apparatus 70 shown in FIGS. 5A and 5B. FIG. 5A is a cross-sectional view of the vibration measurement apparatus 70, and FIG. 5B is a top view of the apparatus 70. The vibration measurement apparatus 70 includes a surface plate 54 composed of stone or the like and a clamping jig 56 fixed on the surface plate 54. One end of a circuit substrate 30 is fixed with the clamping jig 56, and the other end of the circuit substrate 30 which is the farthest position from the one end is released. In this case, the other end deflects due to its own weight. The position of the deflected other end due to its own weight as zero displace point in a vertical direction. The other end of the circuit substrate 30 is pressed using a jig (not shown) by a predetermined distance M from the zero displacement point to a displacement point E, and the force applied by the jig is instantly released. Then, the circuit substrate 30 vibrates up and down with the displacement point E being a starting point, and the amplitude decays with time and disappears in due course.

During decay of vibration after displacing of the circuit substrate 30 to the displacement point E, the displacement of the circuit substrate 30 is measured with time. The measuring method of the displacement is as follows. First, a laser beam 52 is applied from a laser emitter 48 provided above the circuit substrate 30 to the other end of the circuit substrate 30, and reflected light of the laser beam 52 reflected from the main surface 4b of the circuit substrate 30 is observed. Signals of incident light and reflected light of the laser beam are transmitted to a signal amplifier 58 and then analyzed by an oscilloscope 60. Thereby, the displacement (amplitude) at the other end of the main surface 4b of the circuit substrate 30 is measured with time.

Figure 6:
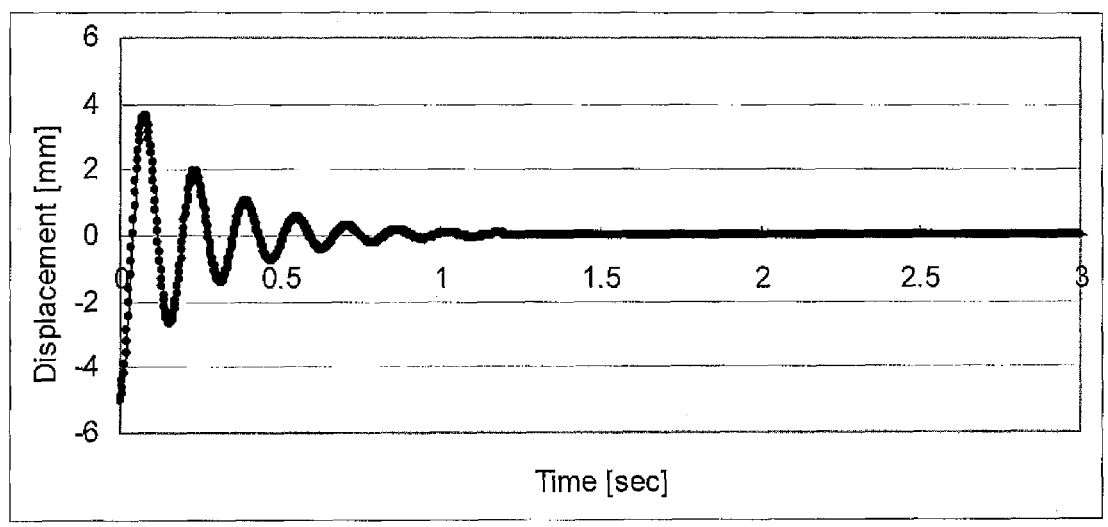
FIG. 6 is a graph showing an example of a vibration decay curve of a circuit substrate according to an embodiment of the present invention, the vibration decay curve being measured using a vibration measurement apparatus.

FIG. 6 is a graph showing an example of a vibration decay curve of the circuit substrate 30, the vibration decay curve being measured using the vibration measurement apparatus shown in FIGS. 5A and 5B. In the graph, the vertical axis represents the displacement (mm) in the up and down directions, and the horizontal axis represents time (second). As is evident from the graph, in the circuit substrate 30, the vibration decays and disappears in about one to two seconds.

As shown in FIG. 1A, preferably, the circuit substrate 30 has a circular shape, which can make the vibration decay time shorter. This is supposedly due to decreased torsional vibration of main surfaces 4a and 4b. Note that in a case that the main surface 4a of the circuit substrate 30 has a circular shape as shown in FIG. 1A, the parameter of "C" in the above-described equation (1) represents a diameter of the main surface 4a because a first imaginary circle inscribed in the main surface 4a substantially corresponds to a circumference of the main surface 4a.

In order to facilitate optical identification of sensors etc. while shortening vibration decay time, preferably, the ceramic substrate 2 contains alumina as a main component. This is because alumina can easily form a white color ceramics which enable position sensors attached to the ceramic substrate to be easily optically identified from the ceramic substrate.

The circuit substrate 30 has conductors 6 in a plurality of through-holes 14 penetrating the ceramic substrate 2 in a thickness direction. Signals generated from the sensors 22 can be directly transmitted between the main surfaces 4a and 4b by way of the conductors 6. The conductor 6 can be bonded to the side surface of the through-hole 14 with a binder 16. Preferably, the conductor 6 is made of any metal selected from Ti, Pt, W, Cr, Rh, Ru, and Ir which have low electrical resistance and are easily bonded to a ceramic. More preferably, the conductor 6 is made of Ti which has a relatively small thermal expansion coefficient. As the material for the binder 16, an Ag—Cu—Ti brazing material is preferable. For example, an Ag—Cu—Ti brazing material having a composition including 50% to 70% of Ag by mass, 20% to 45% of Cu by mass, and 5% to 10% of Ti by mass is used.

Specifically, if the conductors 6 are made of Ti, the conductors 6 can be bonded to the side surface of the through-hole 14 using an Ag—Cu—Ti brazing material in the following manner. That is, an Ag—Cu—Ti brazing material in the form of a paste is filled in the through-hole 14, and a Ti pin is inserted in the through-hole 14 so that a part of the paste filled in the through-hole 14 is pushed out of the through-hole by the inserted Ti pin. Ti pin and paste remaining in the through-hole 14 become the conductor 6. Next, the remaining paste is dried and solidified by heating at about 800° C., followed by cooling. Thereby, the remaining paste bonds the conductor 6 to the ceramic substrate 2.

Preferably, alignment marks 8a and 8b are disposed in a peripheral portion of the ceramic substrate 2. More preferably, the alignment marks 8a and 8b are circular cylinders 18 made of black ceramic penetrating the ceramic substrate 2 in a thickness direction. Thus, the position of the alignment marks can be identified.

The alignment marks 8a and 8b can be used in order to accurately locate positions on the main surfaces 4a and 4b of the circuit substrate 30. Specifically, a pitch of the alignment marks 8a and 8b is measured using a camera, and the center thereof is considered as the origin. Since the origin, is accurately determined, it is possible to accurately form, on the basis of the origin, a wiring pattern, such as conductive wiring, on the circuit substrate 30.

The alignment marks 8a and 8b can be formed by a method in which circular cylinders made of black alumina are prepared, and the circular cylinders are bonded to the inside of through-holes 18 using an epoxy adhesive, followed by solidification. Black alumina contains, for example, iron, cobalt, or manganese as a pigment.

Figure 3:
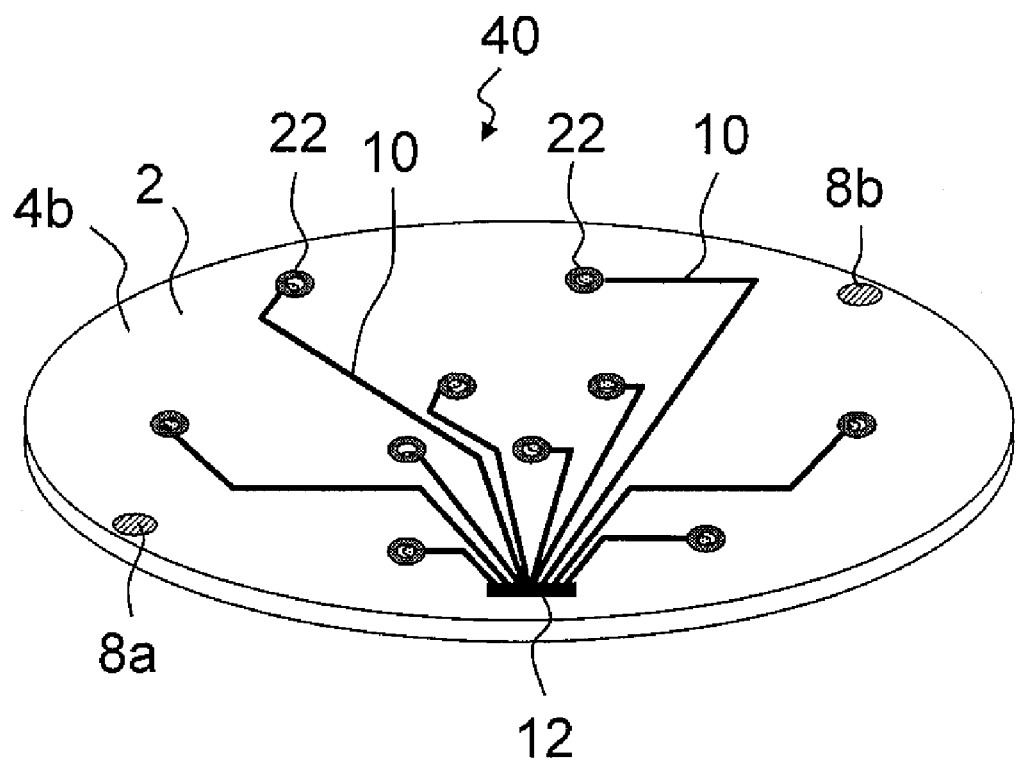
FIG. 3 is a perspective view showing a state in which sensors are attached to a circuit substrate.

Referring to FIG. 3, a sensor-holding substrate 40 in which sensors 22 are attached to a circuit substrate 30 can reduce malfunctions of sensors because the circuit substrate 30 having the short vibration decay time. Examples of the sensors 22 include temperature sensors. Signals transmitted from the sensors 22 pass through wiring lines 10 and are taken out from a signal extracting member 12, and the temperature at the positions of the sensors 22 can be measured. The temperature of each sensor 22 can be determined by detecting signals transmitted from the sensor 22 and converting them into temperature. In order to attach the sensors 22 to the circuit substrate 30, an adhesive or the like can be used.

A method for producing a circuit substrate 30 is specifically described using a case where a ceramic substrate 2 is composed of alumina.

As starting materials, a high-purity alumina powder and small amounts of $MgCO_3$, $CaCO_3$, and $SiO_2$ powders, which serve as sintering aids during firing, are mixed and subjected to wet grinding to thereby obtain a slurry. An organic binder is added to the slurry, and mixing is performed, followed by spray drying to form granules. The resulting granules are formed into a shaped body with a diameter of 370 to 400 mm and a thickness of 6 to 20 mm using a known forming method. Then, if necessary, surfaces of the shaped body are slightly cut. The resulting shaped body is fired in the air at 1,550° C. to 1,650° C. to form a sintered body. The resulting sintered body is subjected to heat treatment by hot isostatic pressing (HIP) in Ar gas, at a temperature lower than the firing temperature and in a range of 1,500° C. to 1,600° C., and at 200 MPa. Thereby, a dense alumina body is formed. The resulting dense alumina body is annealed by retaining for at least five minutes in the air, at a temperature lower than the heat treatment temperature by HIP and in a range of 1,400° C. to 1,550° C. The temperature-lowering rate from the temperature during hot isostatic pressing to the annealing temperature after hot isostatic pressing is set low at less than 1.0° C./h. For example, the temperature-lowering rate is set at 0.6° C./h. After annealing is performed, both main surfaces are polished with a diamond-electrodeposited grindstone using a rotary grinder. Thereby, a disk with a thickness of about 1 mm is obtained. Using a laser beam machine, the resulting disk is machined so as to have an outer diameter of 8 inch or 12 inch, and through-holes 14 in which Ti pins composed of conductors 6 with a diameter of 0.3 to 1 mm are to be inserted, and circular cylindrical through-holes 18 for forming alignment marks 8a and 8b composed of black alumina are formed. The conductors 6 which are Ti pins and the alignment marks 8a and 8b composed of black alumina are formed by the methods described above. After the conductors 6 and the alignment marks 8a and 8b are formed, both main surfaces are further precisely polished so as to obtain a thickness of 775 μm. Thereby, a circuit substrate 30 shown in FIG. 1A is obtained.

Figure 2:
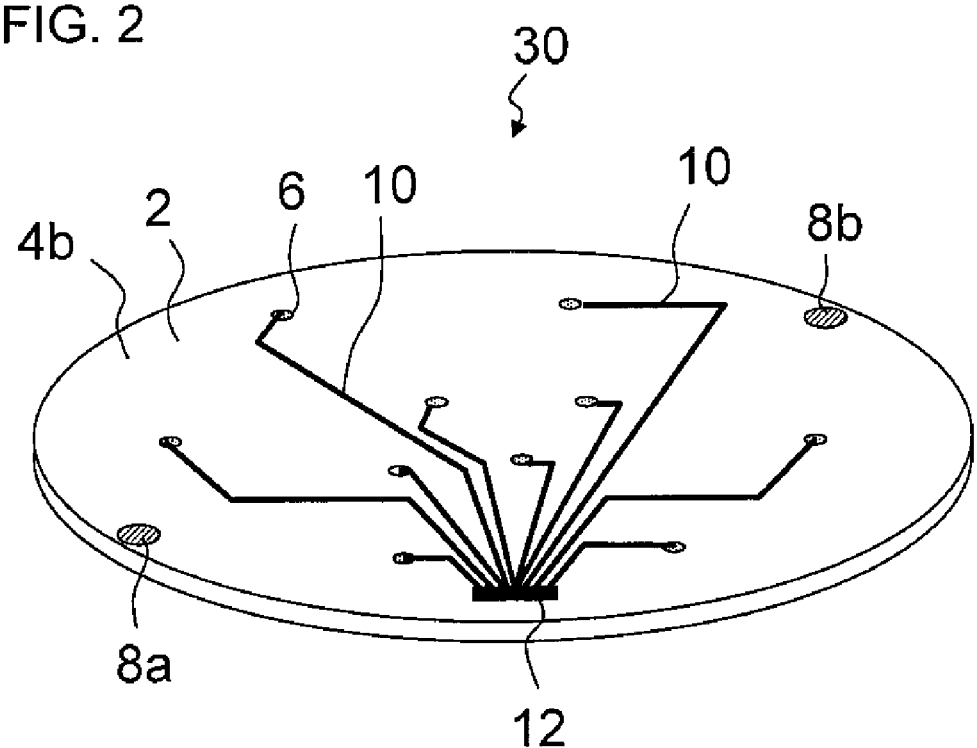
FIG. 2 is a perspective view of a circuit substrate according to an embodiment of the present invention.

Furthermore, as shown in FIG. 2, it is also possible to produce a circuit substrate 30 in which wiring lines 10 composed of a conductive material are bonded to a signal extracting member 12.

In the production method described above, the circuit substrate 30 is produced by subjecting the substrate composed of a sintered ceramic body to hot isostatic pressing, followed by heat treatment (annealing) at a temperature lower than the hot isostatic pressing temperature. Consequently, it is possible to produce a circuit substrate in which decay time of vibration due to deflection can be shortened. Furthermore, the temperature-lowering rate from the temperature during hot isostatic pressing to the annealing temperature after hot isostatic pressing is set low, for example, at 0.6° C./h. By decreasing the temperature-lowering rate in such a manner, it is possible to produce a circuit substrate in which decay time of vibration due to deflection is short. The reason for the fact that the decay time of vibration due to deflection is shortened is supposed to be that internal stress remaining in the dense alumina body is decreased by annealing. Furthermore, the reason for the fact that by decreasing the temperature-lowering rate, the decay time of vibration due to deflection is shortened is supposed to be that disordered alignment of crystal grains caused by fixing is corrected and that stress and the like between crystals can be relaxed.

EXAMPLES

Substrates as circuit substrate 30 shown in FIG. 1A were produced, in which conductors 6 composed of Ti pins and alignment marks 8a and 8b composed of black alumina were formed. The material for the ceramic substrate 2 is shown in Table 1.

[Case where Alumina was Used as Material for Ceramic Substrate]

As starting materials, a high-purity alumina powder and small amounts of $MgCO_3$, $CaCO_3$, and $SiO_2$ powders serving as sintering aids during firing were mixed and subjected to wet grinding to thereby obtain a slurry. An organic binder was added to the slurry, and mixing was performed, followed by spray drying to form granules. The resulting granules were formed into a circular cylindrical body by a rubber press method. The circular cylindrical body was formed into a shaped body with a diameter of 380 mm and a thickness of 14 mm. The resulting shaped body was fired in the air at 1,600° C. to form a sintered body. The resulting sintered body was subjected to heat treatment by hot isostatic pressing (HIP) in Ar gas, at 1,550° C. and 200 MPa. Thereby, a dense body was formed. The resulting dense body was annealed by retaining in the air at 1,500° C. for two hours or at 1,450° C. for two hours. After annealing was performed, both main surfaces were polished with a No. 140 diamond-electrodeposited grindstone using a rotary grinder. Thereby, a disk with a thickness of 1 mm was obtained. Using a $CO_2$ laser beam machine, the resulting disk was machined so as to have an outer diameter of 8 inch (203.2 mm), 12 inch (304.8 mm), or 16 inch (406.4 mm) as shown in Table 1. Furthermore, through-holes 14 in which Ti pins with a diameter of 0.5 mm were to be inserted, and circular cylindrical through-holes 18 with a diameter of 2 mm for forming alignment marks 8a and 8b composed of black alumina were formed. Conductors 6 composed of the Ti pins were bonded with the Ag—Cu—Ti brazing material, and the alignment marks 8a and 8b composed of black alumina were bonded with an epoxy adhesive. After the conductors 6 and the alignment marks 8a and 8b were formed, both main surfaces were further precisely polished so as to obtain a thickness shown in Table 1. Thereby, substrates as the circuit substrate 30 shown in FIG. 1A were obtained.

[Case where Silicon Carbide was Used as Material for Ceramic Substrate]

Substrates 30 were produced as in the case where the material was alumina except for what is described below. An α-SiC powder having an average particle size of 0.6 μm in an amount of 95% by mass, an α-$Al_2O_3$ powder having an average particle size of 0.6 μm in an amount of 4% by mass, and a powder containing 1% of a $Y_2O_3$ powder by mass were mixed and ground in methanol. The $Y_2O_3$ powder has an average particle size of 0.8 μm. A binder was added to the mixture, followed by mixing to make slurry. The resulting slurry was spray-dried to form granules. Firing was performed in Ar gas stream at 2,000° C. with a retention time of one hour. HIP was performed in Ar gas at 1,850° C. and 200 MPa. Annealing was performed in Ar gas at 1 atm at 1,800° C. with a retention time of two hours or at 1,750° C. with a retention time of two hours.

[Case where Silicon Nitride was Used as Material for Ceramic Substrate]

Substrates 30 were produced as in the case where the material was alumina except for what is described below. A silicon nitride powder (BET specific surface: 9 m²/g, α ratio: 98%, oxygen content: 1.2% by mass) in an amount of 89% by mass, a yttrium oxide powder (average particle size: 1.5 μm) in an amount of 5% by mass, an aluminum oxide powder (purity: 99.9% by mass, average particle size: 2 μm) in an amount of 3% by mass, and a powder containing 3% of a silicon dioxide power by mass (purity 99.9% by mass, average particle size: 2 μm) were subjected to wet mixing in methanol. A binder was added to the mixture, and spray drying was performed to form granules. Firing was performed in a sagger composed of silicon carbide by retaining in a nitrogen atmosphere at normal pressure, at 1,300° C. for five hours, and then by retaining at 1,750° C. for five hours. Then, cooling was performed at a rate of 80° C./min to thereby obtain a sintered silicon nitride body. HIP was performed in nitrogen gas, at 1,600° C. and 200 MPa. Annealing was performed in nitrogen gas at 1 atm by retaining at 1,550° C. for two hours or at 1,500° C. for two hours.

[Case where Zirconia was Used as Material for Ceramic Substrate]

Substrates 30 were produced as in the case where the material was alumina except for what is described below. A zirconia oxide powder with an average particle size of 0.2 μm in an amount of 96 mole percent and a powder containing 4 mole percent of a yttrium oxide powder were subjected to wet grinding in water. A binder was further added thereto, and spray drying was performed to form granules. Firing was performed by retaining in the air at 1,500° C. for three hours. HIP was performed in Ar gas at 1,350° C. and 200 MPa. Annealing was performed in the air by retaining at 1,300° C. for two hours or at 1,250° C. for two hours.

The density of each circuit substrate 30 was measured by Archimedes' method. The Young's modulus and the Poisson's ratio were measured by an ultrasonic pulse method. As measurement apparatuses, an HV pulser-receiver Model 5058PR, commercially available from Panametrics, and a 23422A 250MS/s Digital Oscilloscope, commercially available from Tektronix, were used. In the measurement, a longitudinal wave wavelength of 5,000 to 8,000 kHz and a transverse wave wavelength of 2,000 to 5,000 kHz were used. The measurement temperature was 25° C. With respect to each of the Young's modulus and the Poisson's ratio, measurement was performed five times per specimen, and an average value thereof was calculated.

[Own-Weight Deflection]

Own-weight deflection (μm) was measured using the apparatus for measuring own-weight deflection shown in FIG. 4A. The diameter of a supporting circle 3 was set at (C-0.01) m when the maximum diameter was represented by C (diameter of the circuit substrate 30). The value ω represented by the equation (2) was calculated and is shown in Table 1. Note that, in Table 1, as units of measure for length, mm and μm are used for convenience sake. Furthermore, with respect to the diameter C, decimals are omitted.

TABLE 1

| Specimen No. | | Material for ceramic substrate 2 | Annealing temperature (° C.) | Diameter C (mm) | Thickness (mm) | Young's modulus (Gpa) | Poisson's ratio (—) | Density (g/cm$^3$) | ω Calculated value (μm) | Own-weight deflection Z (μm) | Z/ω (—) | Vibration decay time (sec) |
|---|---|---|---|---|---|---|---|---|---|---|---|---|
| 1 | | Alumina | 1500 | 203 | 0.34 | 380 | 0.23 | 3.9 | 70.9 | 78 | 1.1 | 1 |
| 2 | | Alumina | 1450 | 203 | 0.34 | 380 | 0.23 | 3.9 | | 103 | 1.5 | 1.2 |
| 3 | * | Alumina | N/A | 203 | 0.34 | 380 | 0.23 | 3.9 | | 113 | 1.6 | 3.9 |
| 4 | | Alumina | 1500 | 305 | 0.34 | 380 | 0.23 | 3.9 | 358.9 | 380 | 1.1 | 1.9 |
| 5 | | Alumina | 1450 | 305 | 0.34 | 380 | 0.23 | 3.9 | | 538 | 1.5 | 2.4 |
| 6 | * | Alumina | N/A | 305 | 0.34 | 380 | 0.23 | 3.9 | | 585 | 1.6 | 6.3 |
| 7 | | Alumina | 1500 | 406 | 0.34 | 380 | 0.23 | 3.9 | 1134 | 1111 | 1 | 2.7 |
| 8 | | Alumina | 1450 | 406 | 0.34 | 380 | 0.23 | 3.9 | | 1690 | 1.5 | 3.1 |
| 9 | * | Alumina | N/A | 406 | 0.34 | 380 | 0.23 | 3.9 | | 2087 | 1.8 | 7.5 |
| 10 | | Alumina | 1500 | 203 | 0.78 | 380 | 0.23 | 3.9 | 13.5 | 13 | 1 | 0.5 |
| 11 | | Alumina | 1450 | 203 | 0.78 | 380 | 0.23 | 3.9 | | 19 | 1.4 | 0.7 |
| 12 | * | Alumina | N/A | 203 | 0.78 | 380 | 0.23 | 3.9 | | 25 | 1.8 | 2.9 |
| 13 | | Alumina | 1500 | 305 | 0.78 | 380 | 0.23 | 3.9 | 68.3 | 69 | 1 | 1.2 |
| 14 | | Alumina | 1450 | 305 | 0.78 | 380 | 0.23 | 3.9 | | 100 | 1.5 | 1.5 |
| 15 | * | Alumina | N/A | 305 | 0.78 | 380 | 0.23 | 3.9 | | 116 | 1.7 | 4.1 |
| 16 | | Alumina | 1500 | 406 | 0.78 | 380 | 0.23 | 3.9 | 215.7 | 216 | 1 | 1.8 |
| 17 | | Alumina | 1450 | 406 | 0.78 | 380 | 0.23 | 3.9 | | 298 | 1.4 | 2.1 |
| 18 | * | Alumina | N/A | 406 | 0.78 | 380 | 0.23 | 3.9 | | 345 | 1.6 | 5.8 |
| 19 | | Alumina | 1500 | 203 | 1.16 | 380 | 0.23 | 3.9 | 6 | 6 | 1 | 0.1 |
| 20 | | Alumina | 1450 | 203 | 1.16 | 380 | 0.23 | 3.9 | | 9 | 1.5 | 0.2 |
| 21 | * | Alumina | N/A | 203 | 1.16 | 380 | 0.23 | 3.9 | | 10 | 1.6 | 1.1 |
| 22 | | Alumina | 1500 | 305 | 1.16 | 380 | 0.23 | 3.9 | 30.3 | 32 | 1 | 0.8 |
| 23 | | Alumina | 1450 | 305 | 1.16 | 380 | 0.23 | 3.9 | | 43 | 1.4 | 1.1 |
| 24 | * | Alumina | N/A | 305 | 1.16 | 380 | 0.23 | 3.9 | | 50 | 1.7 | 2.3 |
| 25 | | Alumina | 1500 | 406 | 1.16 | 380 | 0.23 | 3.9 | 95.8 | 77 | 0.8 | 1.1 |
| 26 | | Alumina | 1450 | 406 | 1.16 | 380 | 0.23 | 3.9 | | 140 | 1.5 | 1.4 |
| 27 | * | Alumina | N/A | 406 | 1.16 | 380 | 0.23 | 3.9 | | 159 | 1.7 | 3.5 |
| 28 | | Silicon carbide | 1800 | 203 | 0.78 | 430 | 0.16 | 3.2 | 10.5 | 11 | 1 | 0.1 |
| 29 | | Silicon carbide | 1750 | 203 | 0.78 | 430 | 0.16 | 3.2 | | 14 | 1.3 | 0.2 |
| 30 | * | Silicon carbide | N/A | 203 | 0.78 | 430 | 0.16 | 3.2 | | 17 | 1.6 | 1.4 |
| 31 | | Silicon carbide | 1800 | 305 | 0.78 | 430 | 0.16 | 3.2 | 53.3 | 52 | 1 | 0.5 |
| 32 | | Silicon carbide | 1750 | 305 | 0.78 | 430 | 0.16 | 3.2 | | 77 | 1.4 | 0.7 |
| 33 | * | Silicon carbide | N/A | 305 | 0.78 | 430 | 0.16 | 3.2 | | 133 | 2.5 | 2.1 |
| 34 | | Silicon carbide | 1800 | 406 | 0.78 | 430 | 0.16 | 3.2 | 168.4 | 184 | 1.1 | 0.9 |
| 35 | | Silicon carbide | 1750 | 406 | 0.78 | 430 | 0.16 | 3.2 | | 244 | 1.5 | 1.2 |
| 36 | * | Silicon carbide | N/A | 406 | 0.78 | 430 | 0.16 | 3.2 | | 283 | 1.7 | 3.1 |
| 37 | | Silicon nitride | 1550 | 203 | 0.78 | 290 | 0.28 | 3.2 | 13.7 | 14 | 1 | 0.8 |
| 38 | | Silicon nitride | 1500 | 203 | 0.78 | 290 | 0.28 | 3.2 | | 19 | 1.4 | 1 |
| 39 | * | Silicon nitride | N/A | 203 | 0.78 | 290 | 0.28 | 3.2 | | 24 | 1.7 | 4 |
| 40 | | Silicon nitride | 1550 | 305 | 0.78 | 290 | 0.28 | 3.2 | 69.3 | 67 | 1 | 1.8 |
| 41 | | Silicon nitride | 1500 | 305 | 0.78 | 290 | 0.28 | 3.2 | | 101 | 1.5 | 2.1 |
| 42 | * | Silicon nitride | N/A | 305 | 0.78 | 290 | 0.28 | 3.2 | | 113 | 1.6 | 5.8 |
| 43 | | Silicon nitride | 1550 | 406 | 0.78 | 290 | 0.28 | 3.2 | 219 | 197 | 0.9 | 2.7 |
| 44 | | Silicon nitride | 1500 | 406 | 0.78 | 290 | 0.28 | 3.2 | | 234 | 1.1 | 3 |
| 45 | * | Silicon nitride | N/A | 406 | 0.78 | 290 | 0.28 | 3.2 | | 350 | 1.6 | 7.6 |
| 46 | | Zirconia | 1300 | 203 | 0.78 | 200 | 0.31 | 5.6 | 33.5 | 34 | 1 | 1 |
| 47 | | Zirconia | 1250 | 203 | 0.78 | 200 | 0.31 | 5.6 | | 48 | 1.4 | 1.2 |
| 48 | * | Zirconia | N/A | 203 | 0.78 | 200 | 0.31 | 5.6 | | 68 | 2 | 4.5 |
| 49 | | Zirconia | 1300 | 305 | 0.78 | 200 | 0.31 | 5.6 | 169.4 | 183 | 1.1 | 2 |
| 50 | | Zirconia | 1250 | 305 | 0.78 | 200 | 0.31 | 5.6 | | 251 | 1.5 | 2.3 |
| 51 | * | Zirconia | N/A | 305 | 0.78 | 200 | 0.31 | 5.6 | | 296 | 1.8 | 6.5 |
| 52 | | Zirconia | 1300 | 406 | 0.78 | 200 | 0.31 | 5.6 | 535.5 | 546 | 1 | 3 |
| 53 | | Zirconia | 1250 | 406 | 0.78 | 200 | 0.31 | 5.6 | | 782 | 1.5 | 3.5 |
| 54 | * | Zirconia | N/A | 406 | 0.78 | 200 | 0.31 | 5.6 | | 368 | 1.6 | 9.1 |

[Vibration Decay Time]

With respect to the resulting circuit substrates 30, a vibration decay curve was measured using the vibration measurement apparatus shown in FIGS. 5A and 5B. The distance M shown in FIG. 5A was set at 5 mm. Furthermore, the portion of each of main surfaces 4a and 4b clamped by the jig 56 extended from the end of each of the main surfaces 4a and 4b toward the center of the ceramic substrate 2 by a distance of up to 8 mm. The results are shown in Table 1. FIG. 6 is a graph showing a vibration decay curve of Specimen No. 13.

COMPARATIVE EXAMPLES

Figure 7:
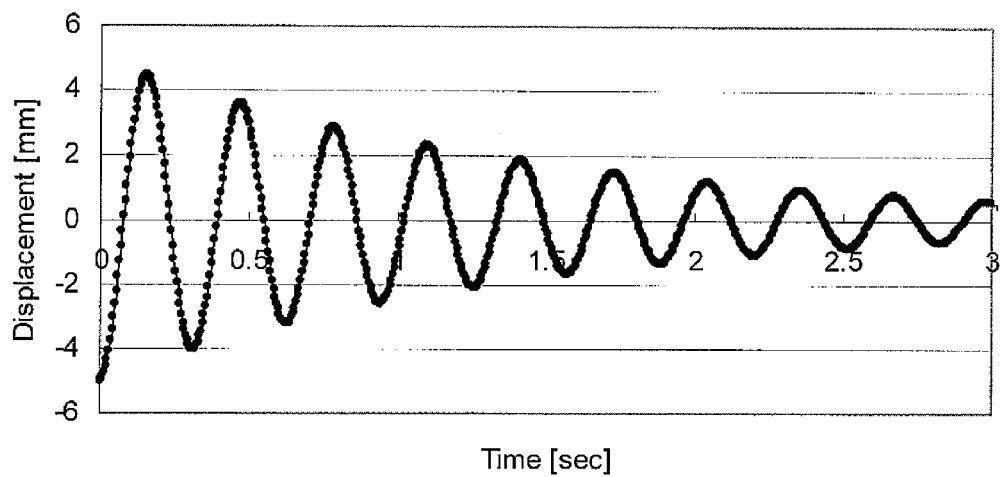
FIG. 7 is a graph showing a vibration decay curve of a circuit substrate which is out of the range of the present invention.

Specimens with asterisked numbers were produced in the same manner as Examples except that annealing was not performed, and evaluations were performed as in Examples. The results are shown in Table 1. FIG. 7 is a graph showing a vibration decay curve of Specimen No. 15.

As is evident from Table 1, comparing with circuit substrates composed of the same material and having the same diameter and thickness, the specimens of Examples having a z/ω ratio of 1.5 or less have the vibration decay time shorter than half that of specimens of Comparative Examples having a z/ω ratio exceeding 1.5. By performing annealing treatment after HIP, it was possible to produce circuit substrates 30 having a short vibration decay time.

The invention claimed is:

1. A composition comprising:
an annealed ceramic substrate including a main surface, the ceramic substrate having been annealed at a temperature of 1250° C. or more and 1800° C. or less,
wherein the annealed ceramic substrate comprises a ceramic selected from the group consisting of sintered alumina, sintered silicon carbide, sintered silicon nitride and sintered zirconia,
wherein a diameter of a first imaginary circle inscribed in a circumference of the main surface is represented by C (m), a thickness of the ceramic substrate is represented by h (m), a Poisson ratio of the ceramic substrate is represented by ν, a density of the ceramic substrate is represented by ρ(kg/m³), a Young's modulus of the ceramic substrate is represented by E(Pa), a deflection in a direction of gravity of the ceramic substrate is represented by X (m), the deflection being measured in a condition that the ceramic substrate is supported in a region between the first imaginary circle and a second imaginary circle which is a concentric circle of the first imaginary circle and has a diameter of C-0.01 (m),
wherein the diameter of the first imaginary circle is 0.203 m or more, the thickness of the ceramic substrate is 0.00034 m or more and 0.00116 m or less, the Young's modulus of the ceramic substrate is 200 GPa or more and 430 GPa or less, the Poisson ratio ν of the ceramic substrate is 0.16 or more and 0.31 or less, the density ρ of the ceramic substrate is 3.2 g/cm³ or more and 5.6 g/cm³ or less, and
wherein the following equations are satisfied:

$X \leq 1.5 \times (C^4 h^2) \times A$, wherein $A = \{3 \times 9.807 \times \rho \times (1-\nu^2) \times 5+\nu)\} / \{2^8 \times (1+\nu) \times E\}$, and wherein when the ceramic substrate is freely vibrated in a thickness direction thereof in a condition that the ceramic substrate is supported at an end thereof, a decay time of free vibration of the ceramic substrate is 2 s or less.

2. The composition according to claim 1, wherein the main surface of the ceramic substrate has a circular shape.

* * * * *